(12) United States Patent
Park et al.

(10) Patent No.: US 11,449,115 B2
(45) Date of Patent: Sep. 20, 2022

(54) METHOD FOR RECEIVING POWER FROM OTHER EXTERNAL DEVICE CONNECTED TO ELECTRONIC DEVICE, ON BASIS OF DISCONNECTION OF EXTERNAL ELECTRONIC DEVICE THAT IS SUPPLYING POWER, AND ELECTRONIC DEVICE IMPLEMENTING SAME

(71) Applicant: Samsung Electronics Co., Ltd., Gyeonggi-do (KR)

(72) Inventors: Sangkyung Park, Gyeonggi-do (KR); Youngchul Shin, Gyeonggi-do (KR); Chijeong Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/960,149

(22) PCT Filed: Feb. 20, 2019

(86) PCT No.: PCT/KR2019/002026
§ 371 (c)(1),
(2) Date: Jul. 6, 2020

(87) PCT Pub. No.: WO2019/168291
PCT Pub. Date: Sep. 6, 2019

(65) Prior Publication Data
US 2021/0124403 A1    Apr. 29, 2021

(30) Foreign Application Priority Data
Feb. 27, 2018    (KR) .......................... 10-2018-0023508

(51) Int. Cl.
*G06F 1/26* (2006.01)
*G06F 1/16* (2006.01)
(Continued)

(52) U.S. Cl.
CPC .............. *G06F 1/266* (2013.01); *G06F 1/163* (2013.01); *G06F 13/102* (2013.01); *G06F 3/14* (2013.01);
(Continued)

(58) Field of Classification Search
CPC ........ G06F 1/266; G06F 1/163; G06F 13/102; G06F 3/14; H01R 13/6275; H01R 13/633
See application file for complete search history.

(56) References Cited

U.S. PATENT DOCUMENTS 9,703,741 B2    7/2017 Morrison et al.
10,169,284 B2    1/2019 Morrison et al.
(Continued)

FOREIGN PATENT DOCUMENTS

EP    3063639 A1    9/2016
JP    2017-33321 A    2/2017
(Continued)

OTHER PUBLICATIONS

European Search Report dated May 10, 2021.
Indian Search Report dated Nov. 15, 2021.

*Primary Examiner* — Nimesh G Patel
(74) *Attorney, Agent, or Firm* — Cha & Reiter, LLC

(57) ABSTRACT

Disclosed is an electronic device. According to an embodiment disclosed in this specification, an electronic device may include a first interface, a second interface, an input device generating a specified signal associated with disconnection of a first external electronic device, and a processor operatively connected to the first interface, the second interface, and the input device. The processor may be configured to receive power from the first external electronic device through the first interface in a state where the first external electronic device is connected to the first interface and a second external electronic device is connected to the second interface, and to receive power from the second (Continued)

external electronic device through the second interface when receiving the specified signal generated by the input device. Other various embodiments as understood from the specification are also possible.

15 Claims, 16 Drawing Sheets

(51) Int. Cl.
  *G06F 13/10* (2006.01)
  *G06F 3/14* (2006.01)
  *H01R 13/627* (2006.01)
  *H01R 13/633* (2006.01)

(52) U.S. Cl.
  CPC ........ *H01R 13/6275* (2013.01); *H01R 13/633* (2013.01)

(56) References Cited

U.S. PATENT DOCUMENTS

| | | | |
|---|---|---|---|
| 10,275,005 B2 | 4/2019 | Kang et al. | |
| 10,283,081 B2 | 5/2019 | Sahin | |
| 2009/0184932 A1* | 7/2009 | Alten | G06F 13/409 345/173 |
| 2014/0208134 A1 | 7/2014 | Waters et al. | |
| 2015/0115898 A1* | 4/2015 | Yung | H02J 7/0021 320/152 |
| 2016/0072330 A1 | 3/2016 | He et al. | |
| 2016/0104451 A1 | 4/2016 | Sahin | |
| 2016/0259749 A1 | 9/2016 | Morrison et al. | |
| 2017/0147052 A1 | 5/2017 | Waters et al. | |
| 2017/0170974 A1 | 6/2017 | Kang et al. | |
| 2017/0212574 A1* | 7/2017 | Kang | G06F 1/266 |
| 2017/0308495 A1 | 10/2017 | Morrison et al. | |
| 2017/0336964 A1* | 11/2017 | Kim | G06F 3/03547 |
| 2019/0324510 A1* | 10/2019 | Hijazi | G06F 1/266 |
| 2019/0392779 A1 | 12/2019 | Sahin | |

FOREIGN PATENT DOCUMENTS

| | | |
|---|---|---|
| KR | 10-2017-0071068 A | 6/2017 |
| KR | 10-2017-0088204 A | 8/2017 |

* cited by examiner

METHOD FOR RECEIVING POWER FROM OTHER EXTERNAL DEVICE CONNECTED TO ELECTRONIC DEVICE, ON BASIS OF DISCONNECTION OF EXTERNAL ELECTRONIC DEVICE THAT IS SUPPLYING POWER, AND ELECTRONIC DEVICE IMPLEMENTING SAME

CROSS REFERENCE TO RELATED APPLICATIONS

This application is a National Phase Entry of PCT International Application No. PCT/KR2019/002026, which was filed on Feb. 20, 2019, and claims a priority to Korean Patent Application No. 10-2018-0023508, which was filed on Feb. 27, 2018, the contents of which are incorporated herein by reference.

TECHNICAL FIELD

Embodiments disclosed in this specification relate to a power supply technology for an electronic device.

BACKGROUND ART

An electronic device (e.g., a wearable device) may receive data from an external electronic device and may output the received data through an output device (e.g., a display). The electronic device may receive driving power in addition to data from an external electronic device. For example, the external electronic device may include at least one of a portable electronic device or a charger (e.g., a travel adaptor (TA)). For example, the electronic device may receive driving power together with data from an external electronic device (e.g., a portable electronic device) equipped with a battery. For another example, the electronic device may receive driving power from an external electronic device (e.g., a charger) connected to an external power supply and may receive data from a portable electronic device.

DISCLOSURE

Technical Problem

When receiving driving power from a charger, an electronic device may charge a portable electronic device by supplying the received driving power to the portable electronic device. For example, when identifying the installation of the charger, the electronic device may transmit information indicating the installation of the charger to the portable electronic device; when identifying the detachment of the charger, the electronic device may transmit information indicating the detachment of the charger to the portable electronic device. When receiving information indicating the installation of the charger, the portable electronic device cuts off the driving power being supplied to the electronic device; when receiving information indicating the detachment of the charger, the portable electronic device may supply driving power to the electronic device again.

When the electronic device does not include a battery, the electronic device may not receive the driving power until the electronic device receives the driving power from the portable electronic device after the charger is detached, and thus may be turned off.

Various embodiments disclosed in the disclosure provide an electronic device operating with external power capable of preventing reset when the external power supply is replaced.

Technical Solution

According to an embodiment disclosed in this specification, an electronic device may include a first interface, a second interface, an input device generating a specified signal associated with disconnection of a first external electronic device, and a processor operatively connected to the first interface, the second interface, and the input device. The processor may be configured to receive power from the first external electronic device through the first interface in a state where the first external electronic device is connected to the first interface and a second external electronic device is connected to the second interface, and to receive power from the second external electronic device through the second interface when receiving the specified signal generated by the input device.

Furthermore, according to an embodiment disclosed in this specification, an electronic device may include a display, a first interface, a second interface, a power supply circuit electrically connected to a first power supply terminal of the first interface and a second power supply terminal of the second interface, and a switch circuit electrically connected between the second power supply terminal and the power supply circuit, a detection circuit, and a control circuit. The control circuit may be configured to supply at least part of power supplied through the first power supply terminal from a first power supply of a first external electronic device electrically connected through the first interface, to the display through the power supply circuit, to supply at least another part of power supplied from the first power supply through the second power supply terminal to a second external electronic device electrically connected to the second interface by electrically connecting to the switch circuit, to identify a signal associated with the separation, using the detection circuit in a state where the first external electronic device and the second external electronic device are connected to the electronic device, before the first external electronic device is separated from the first interface, electrically open the switch circuit based at least on a signal associated with the separation and change settings associated with the second interface between the electronic device and the second external electronic device such that the electronic device receives power supplied from a second power supply of the second external electronic device through the second power supply terminal before the first external electronic device is separated, and supply at least part of power supplied from the second power supply of the second external electronic device electrically connected through the second power supply terminal, to the display through the power supply circuit based at least on the changed settings before the first external electronic device is separated.

Advantageous Effects

According to the embodiments disclosed in this specification, it is possible to prevent the reset of an electronic device driven by external power when the external power is replaced. Besides, a variety of effects directly or indirectly understood through the disclosure may be provided.

DESCRIPTION OF DRAWINGS

With regard to description of drawings, the same or similar components may be marked by the same or similar reference numerals.

MODE FOR INVENTION

Figure 1:
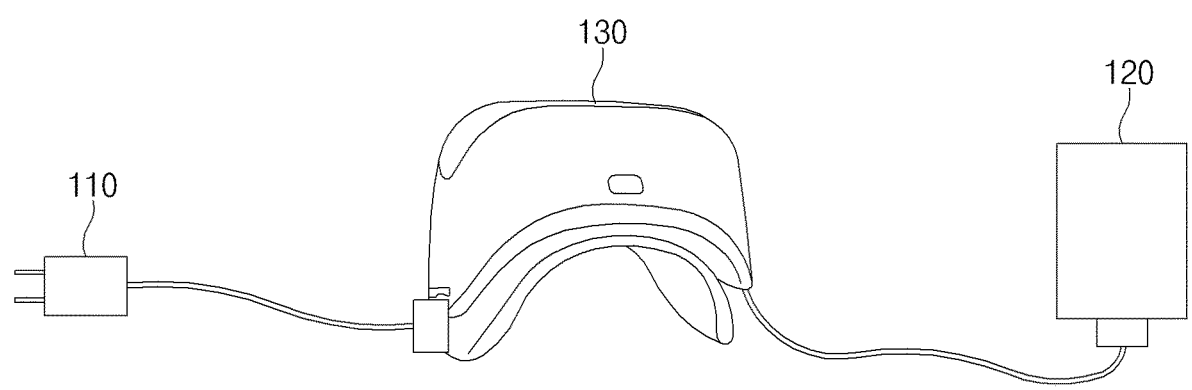
FIG. 1 shows a connection structure of an electronic device, a first external electronic device, and a second external electronic device according to an embodiment.

FIG. 1 shows a connection structure of an electronic device, a first external electronic device, and a second external electronic device according to an embodiment.

Referring to FIG. 1, according to an embodiment, an electronic device 130 may be electrically connected to at least one external electronic device of the first external electronic device 110 or a second external electronic device 120.

According to an embodiment, the first external electronic device 110 is electrically connected to the electronic device 130 through a first interface of the electronic device 130 and may deliver the specified power to the electronic device 130 through the first interface. For example, the first external electronic device 110 may convert external power (e.g., about 220 V) received from a second external power supply (e.g., AC power) to generate a specified power and may output the generated power. For example, the first external electronic device 110 may include a USB charger, a travel charger (a travel adapter or a wall charger), or the like. For another example, the first external electronic device 110 may receive the specified power (e.g., about 5 V) from the first external power source (e.g., USB power source) and may output (e.g., bypass) the received power.

According to an embodiment, the second external electronic device 120 may be electrically connected to the electronic device 130 through a second interface of the electronic device 130 and may transmit and receive at least one of data (e.g., control data, image data, or the like) or power with the electronic device 130 through the second interface. For example, the second external electronic device 120 may include a battery and may convert the power from the battery into the specified power to transmit the specified power to the electronic device 130. For another example, the second external electronic device 120 may include a memory and may transmit data (e.g., image data) stored in the memory to the electronic device 130. For still another example, the second external electronic device 120 may receive data associated with a power switch request from the electronic device 130 and may operate as a power supply device (e.g., source) that outputs power in response to the received data or as a power reception device (e.g., sink) that receives external power. For example, the second external electronic device 120 may include a mobile terminal (e.g., a smartphone, or the like).

According to an embodiment, the electronic device 130 may be connected to the first external electronic device 110 via a first interface and may be connected to the second external electronic device 120 via a second interface. The electronic device 130 may receive power from at least one of the first external electronic device 110 or the second external electronic device 120 without including a battery and may operate using the received power. The electronic device 130 may include an output device (e.g., a display); when receiving data (image data) from the second external electronic device 120, the electronic device 130 may output the received data through the output device. Upon transmitting data (control data) associated with the power switch request to the second external electronic device 120, the electronic device 130 may switch the second external electronic device 120 into a power supply device or a power reception device. For example, the electronic device 130 may include a wearable device. The wearable device may include an earphone device, a headphone device, a virtual reality (VR) device, or the like. Besides, the electronic device 130 may be an accessory device capable of being connected to an external electronic device. For example, the electronic device 130 may include a dock device, or the like.

According to an embodiment, the electronic device 130 may include an input device; the electronic device 130 may mechanically lock the first external electronic device 110 to the first interface through the input device or may release mechanical lock.

Figure 2:
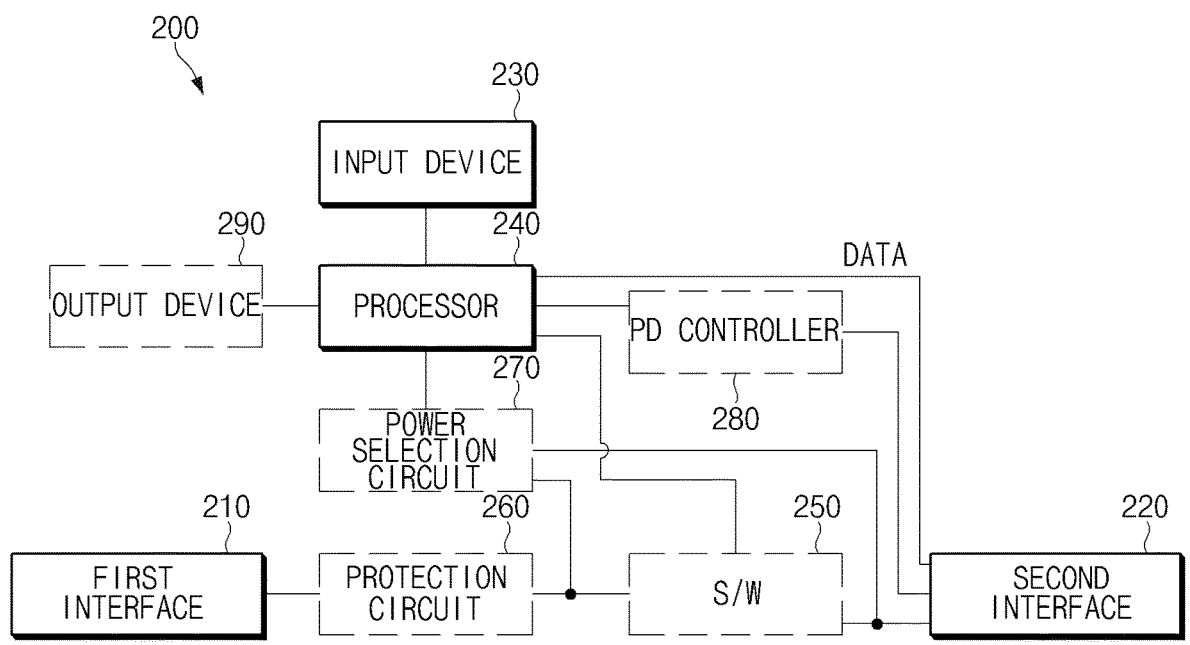
FIG. 2 is a block diagram of an electronic device according to an embodiment.

FIG. 2 is a block diagram of an electronic device according to an embodiment.

Referring to FIG. 2, according to an embodiment, an electronic device 200 (e.g., 130 in FIG. 1) may include a first interface 210, a second interface 220, an input device 230, and a processor 240. In an embodiment, a part of components may omitted or an additional component may be further included. For example, the electronic device 200 may further include at least one of a switch 250, a protection circuit 260, a power selection circuit 270, a PD controller 280, or an output device 290. In this specification, it is described that the electronic device 200 includes the switch 250, the protection circuit 260, the power selection circuit 270, the PD controller 280, and the output device 290 as an example. In an embodiment, some components may be combined to form one entity, which may identically perform functions of some components before the combination. For example, the PD controller 280 may be included in the second interface 220. The input/output relationship illustrated in FIG. 2 is only an example for convenience of description, and may not be limited thereto.

According to an embodiment, the first interface 210 may include a socket electrically connected to the first external electronic device 110. For example, the first interface 210 may include a socket; when the plug of the first external electronic device 110 is electrically connected to the socket, the first interface 210 may receive power (e.g., 5 V) from the first external electronic device 110 through a socket. For example, the socket may be a socket of USB type-C standard. Alternatively, the first interface 210 may include a plug and may be electrically connected to the socket of the first external electronic device 110.

According to an embodiment, the second interface 220 may include a plug electrically connected to the second external electronic device 120. For example, the second interface 220 may include a plug; when the plug is electrically connected to the socket of the second external electronic device 120, the electronic device 200 may transmit and receive at least one of data or power with the second external electronic device 120. The plug may be a plug of USB type-C standard. The data may include control data and output data (e.g., image data). The plug may be electrically connected to the first end of the cable extending to the outside of the electronic device 200; the second end of the cable may be connected to the printed circuit board of the electronic device 200. Alternatively, the second interface 220 may include a socket and may be electrically connected to the plug of the second external electronic device 120.

According to an embodiment, the input device 230 may generate a first signal associated with the disconnection of the first external electronic device 110. For example, when the input device 230 enters the first state depending on the input of the external object, the input device 230 may release the first external electronic device 110 from being mechanically locked to the first interface. The input device 230 may output a first signal in the first state. For another example, when the input device 230 enters the second state depending on another input of the external object, the input device 230 may mechanically lock the first external electronic device 110 to the first interface 210. The input device 230 may output a second signal in the second state. For example, the input device 230 may include a push button switch or a tap switch in which a state (the first state or the second state) is switched depending on the input by an external object. For example, the input device 230 may be formed to be in a first state when being pressed by an external object (a user); and, the input device 230 may be formed to be in a second state when not pressed by an external object. It will be described later that the input device 230 mechanically locks the first external electronic device 110 or releases the mechanical lock to the first external electronic device 110, with reference to FIG. 5.

According to an embodiment, the switch 250 is provided between the first interface 210 and the second interface 220, and may be opened or shorted under the control of the processor 240. The switch 250 may deliver at least part of power received from the first external electronic device 110 to the second external electronic device 120 through the second interface 220 at the short-circuit time. The rest of the power received from the first external electronic device 110 may be used as the driving power of the electronic device 130. For example, the switch 250 may include a load switch.

According to an embodiment, the protection circuit 260 may be provided on a path for receiving power from the first external electronic device 110 via the first interface 210. When the voltage received through the first interface 210 is not less than a threshold magnitude, the protection circuit 260 may cut off the output of the received power. Furthermore, when the voltage received through the first interface 210 is less than the threshold magnitude, the protection circuit 260 may output (e.g., bypass) the received power. For example, the protection circuit 260 may include an overvoltage protection circuit.

According to an embodiment, the power selection circuit 270 may receive power through at least one of the first interface 210 or the second interface 220 and may output one of the received powers as the driving power of the components of the electronic device 200. For example, when receiving power through the first interface 210 or the second interface 220, the power selection circuit 270 may output the received single power. For another example, when the power selection circuit 270 receives the power from both the first interface 210 (being received from the first external electronic device 110) and the second interface 220 (e.g., being received from the second external electronic device 120), the power selection circuit 270 may selectively output relatively high power among the two received powers (e.g., being supplied to the processor 240).

According to an embodiment, the power selection circuit 270 may include a comparator, a first switch, and a second switch. The comparator may compare the magnitude of the voltage from the first external electronic device 110 with the magnitude of the voltage from the second external electronic device 120. The first switch 250 may be provided on a path through which power is supplied from the first external electronic device 110; when the power from the first external electronic device 110 is greater than the power from the second external electronic device 120, the first switch 250 may be shorted; otherwise, the first switch 250 may be opened. The second switch may be provided on a path through which power is supplied from the second external electronic device 120; when the power from the second external electronic device 120 is greater than the power from the first external electronic device 110, the second switch may be shorted; otherwise, the second switch may be opened. The output power of the power selection circuit 270 may be used as the driving power of components of the electronic device 200 including the processor 240.

According to an embodiment, the power delivery (PD) controller 280 may communicate with the second external electronic device 120 depending on the command of the processor 240 (e.g., USB Type-C communication) and then may transmit data associated with a first power switch request or data associated with a second power switch request to the second external electronic device 120. For example, the data associated with the first power switch request may include a request (a power role swap request) that allows the second external electronic device 120 to output power. When receiving the data associated with the first power switch request, the second external electronic device 120 may operate as a power supply device (source) in response to the received data, and the electronic device 200 may operate as a power reception device (sink). For example, the data associated with the second power switch request may include a request of cutting off the power output of the second external electronic device 120. When receiving the data associated with the second power switch request, the second external electronic device 120 may operate as a power reception device (sink) in response to the received data, and the electronic device 200 may operate as a power supply device (source).

The PD controller 280 may convert a data transmission/reception standard received from the second external electronic device 120 through the second interface 220 depending on the command of the processor 240. For example, the data transmission/reception standard may include a display port, a high definition multimedia interface (HDMI), a video graphics array (VGA), or the like.

According to an embodiment, the output device 290 may output data received from the second external electronic device 120 through the second interface 220 depending on the command of the processor 240. For example, the received data may include at least one of audio data or image data (e.g., video data). The output device 290 may include at least one of a sound output device (e.g., a speaker, a headphone, an earphone, or the like) outputting audio data or a display outputting video data.

The processor 240 may perform data processing or an operation associated with a control and/or a communication of at least one other component(s) of the electronic device 200 by using the instructions stored in the memory (not illustrated). For example, the processor 240 may include at least one a central processing unit (CPU), a graphic processing unit (GPU), a microprocessor, an application processor (AP), and an application specific integrated circuit (ASIC), a field programmable gate arrays (FPGA) and may have a plurality of cores.

According to an embodiment, when receiving data (image data) from the second external electronic device 120, the processor 240 may output the received data through the output device 290. For example, in a state where the first external electronic device 110 is not connected to the first interface 210, and the second external electronic device 120 is connected to the second interface 220, the processor 240 may receive power and data (image data) from the second external electronic device 120 through the second interface 220 and may output the received data through the output device 290 while operating using the received power.

According to an embodiment, when the first external electronic device 110 is connected, the processor 240 may receive power from the first external electronic device 110 and then may deliver the received power to the second external electronic device 120. For example, in a state where the second external electronic device 120 is connected to the second interface 220, when identifying that the first external electronic device 110 is connected to the first interface 210, the processor 240 may transmit data associated with a second power switch request to the second external electronic device 120. For example, the data associated with the second power switch request may include a request that allows the second external electronic device 120 to cut off the power output. For another example, the data associated with the second power switch request may include a request that allows the second external electronic device 120 to operate as a power reception device (sink). The processor 240 may identify that the first external electronic device 110 is connected to the first interface 210, depending on detecting whether power is received from the first external electronic device 110.

When identifying that the first external electronic device 110 is connected to the first interface 210, the processor 240 may short the switch 250. As the switch 250 is shorted, at least part of the power received from the first external electronic device 110 may be delivered to the second external electronic device 120 through the switch 250. For example, the processor 240 may short the switch 250 at the time of transmitting the data associated with the second power switch request to the second external electronic device 120. For another example, the processor 240 may transmit a second power switch request to the second external electronic device 120 and may short the switch 250 after waiting until the power from the second external electronic device 120 is cut off. According to the above-described embodiment, the processor 240 may prevent the two received powers from colliding with each other as power is received from both the first external electronic device 110 and the second external electronic device 120.

According to an embodiment, while the processor 240 operates using power from the first external electronic device 110, when identifying a disconnection notice (e.g., a first signal) of the first external electronic device 110, the processor 240 may request the second external electronic device 120 to supply power. For example, the first signal may be a signal output to provide a notification that the input device 230 is switched to the first state depending on the input of the external object. The first state may be a state in which the input device 230 releases the first external electronic device 110 from being mechanically locked to the first interface 210 (or a state in which the first external electronic device 110 is mechanically detached from the input device 230). For example, while receiving power from the first external electronic device 110 connected to the first interface 210, when the processor 240 receives the first signal from the input device 230, the processor 240 may be configured to receive power from the second external electronic device 120 through the second interface 220 (e.g., changing settings associated with the second interface between the electronic device and the second external electronic device). For another example, while receiving power from the first external electronic device 110 connected to the first interface 210, when the processor 240 receives the first signal from the input device 230, the processor 240 may transmit data associated with the first power switch request to the second external electronic device 120 through the second interface 220 and may receive power from the second external electronic device 120 in response to the first power switch request. According to the above-described embodiment, before the first external electronic device 110 is electrically disconnected from the first interface 210, the processor 240 may receive power from the second external electronic device 120; accordingly, as the power is temporarily cut off while the power supply source is being replaced, the problem that the electronic device 200 is temporarily turned off and initialized may be prevented.

The processor 240 may transmit data associated with the first power switch request and may open the switch 250. For example, the processor 240 may open the switch 250 at the time of transmitting data associated with the first power switch request. For another example, the processor 240 may transmit the first power switch request, and then may open the switch 250 after waiting until the power is supplied from the second external electronic device 120. According to the above-described embodiment, the processor 240 may prevent the two powers from colliding with each other as power is received from both the first external electronic device 110 and the second external electronic device 120.

According to an embodiment, while receiving power from both the first external electronic device 110 and the second external electronic device 120, the processor 240 may request the second external electronic device 120 to stop supplying power. For another example, while receiving power from both the first external electronic device 110 and the second external electronic device 120, when the processor 240 receives the second signal from the input device 230, the processor 240 may transmit data associated with the second power switch request to the second external electronic device 120 through the second interface 220. The second external electronic device 120 may stop outputting power through the second interface 220 in response to the second power switch request. When the processor 240 receives the second signal, the processor 240 may short the switch 250 and may deliver at least part of power from the first external electronic device 110 to the second external electronic device 120 via the switch 250. According to the above-described embodiment, in the first state of the input device 230, when the first external electronic device 110 is not electrically disconnected from the electronic device 200, the processor 240 may prevent a collision between the power of the first external electronic device 110 and the power of the second external electronic device 120 upon cutting off the power from the second external electronic device 120.

According to an embodiment, when the first external electronic device 110 is disconnected from the first interface 210 after the processor 240 receives the first signal, the processor 240 may receive power from the second external electronic device 120 through the second interface 220 and operate using the received power. When identifying that power from the first external electronic device 110 is not received, the processor 240 may identify that the first external electronic device 110 is disconnected from the first interface 210. In the first interface 210, the electronic device 200 may operate as a power reception device (sink), and the second external electronic device 120 may operate as a power supply device (source).

According to an embodiment, the input device 230 may include a grip sensor, which is positioned to detect a grip on at least part of the first interface 210 by an external object, instead of the mechanical fixation described above. To connect to the first external electronic device 110 to the first interface 210, when an external object grips at least part of the first interface 210, the grip sensor may output a first signal; when the external object does not grip the first interface 210, the grip sensor may output a second signal. When the processor 240 receives the first signal, the processor 240 may transmit data associated with the first power switch request to the second external electronic device 120 and may short the switch 250. On the other hand, when the processor 240 receives the second signal, the processor 240 may transmit data associated with the second power switch request to the second external electronic device 120 and may open the switch 250.

According to an embodiment, the input device 230 may include a touch sensor, which is positioned to detect a touch to at least part of the first interface 210. To connect to the first external electronic device 110 to the first interface 210, when an external object touches at least part of the first interface 210, the touch sensor may output a first signal; when the external object does not touch the first interface 210, the touch sensor may output a second signal. When the processor 240 receives the first signal, the processor 240 may transmit data associated with the first power switch request to the second external electronic device 120 and may short the switch 250. On the other hand, when the processor 240 receives the second signal, the processor 240 may transmit data associated with the second power switch request to the second external electronic device 120 and may open the switch 250.

According to the above-described embodiment, when the electronic device 130 detects that the first external electronic device 110 is disconnected from the first interface 210, the electronic device 130 may quickly switch the second external electronic device 120 from a power reception device to a power supply device; accordingly, before the first external electronic device 110 is electrically disconnected from the electronic device 130, the electronic device 130 may receive driving power from the second external electronic device 120. As such, the electronic device 130 may prevent the reset of the electronic device 200 due to the temporary interruption of a power supply in the process of replacing the power supply.

FIGS. 3A to 3D are diagrams for describing a process, in which a power supply source is replaced from a first external electronic device to a second external electronic device, according to an embodiment.

Figure 3A:
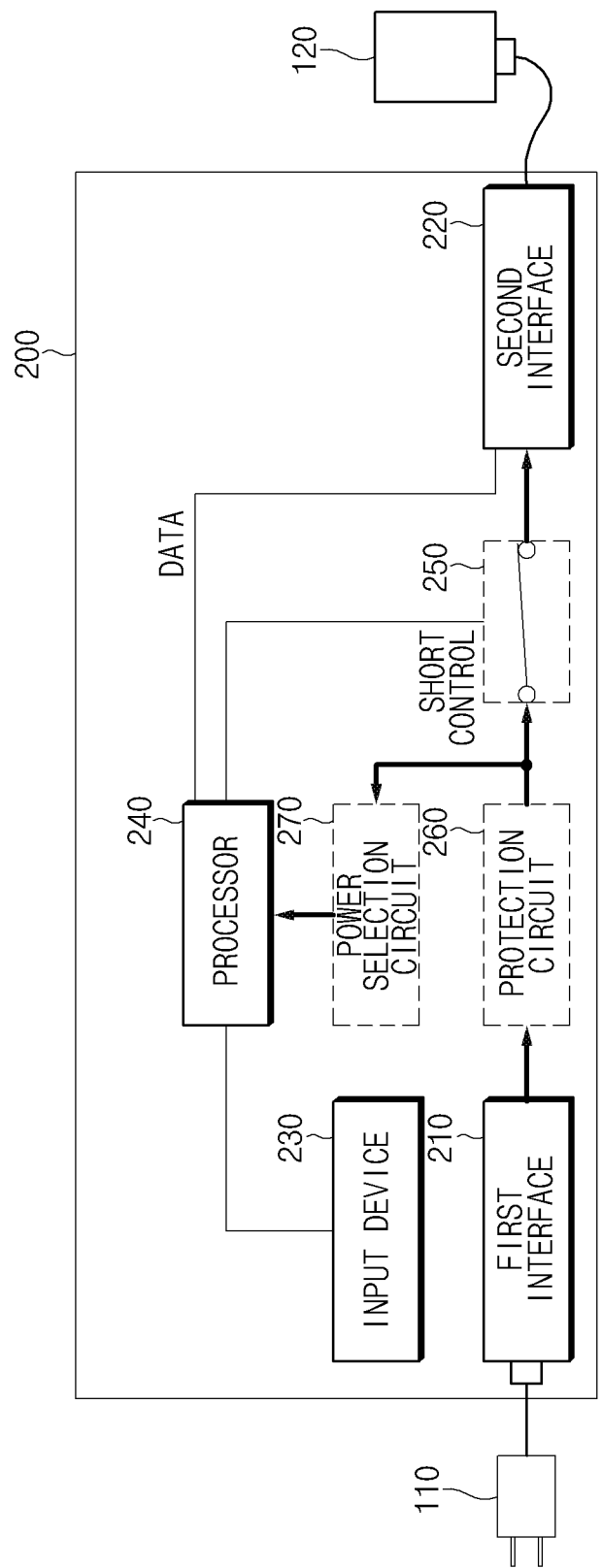
FIGS. 3A to 3D are diagrams for describing a process, in which power is replaced from power of a first external electronic device to power of a second external electronic device, according to an embodiment.

FIG. 3A is a diagram illustrating a power flow in a case where a first external electronic device (e.g., 110 of FIG. 1) and a second external electronic device (e.g., 120 of FIG. 1) are connected to an electronic device, according to an embodiment.

Referring to FIG. 3A, the second external electronic device 120 may be connected to the second interface 220 and the first external electronic device 110 may be connected to the first interface 210. In this case, while the processor 240 operates using the power from the first external electronic device 110, the processor 240 may output data from the second external electronic device 120 through the output device 290. Upon controlling the short of the switch 250, the processor 240 may deliver at least part of power received from the first external electronic device 110 to the second external electronic device 120 through the protection circuit 260 and the switch 250. To this end, when identifying that the first external electronic device 110 is connected to the first interface 210, the processor 240 may transmit data associated with a second power switch request to the second external electronic device 120 and may short the switch 250. In FIG. 3A, the power selection circuit 270 may receive the rest of the power received from the first external electronic device 110 and may output the received power as the driving power of the electronic device 200 including the processor 240.

Figure 3B:
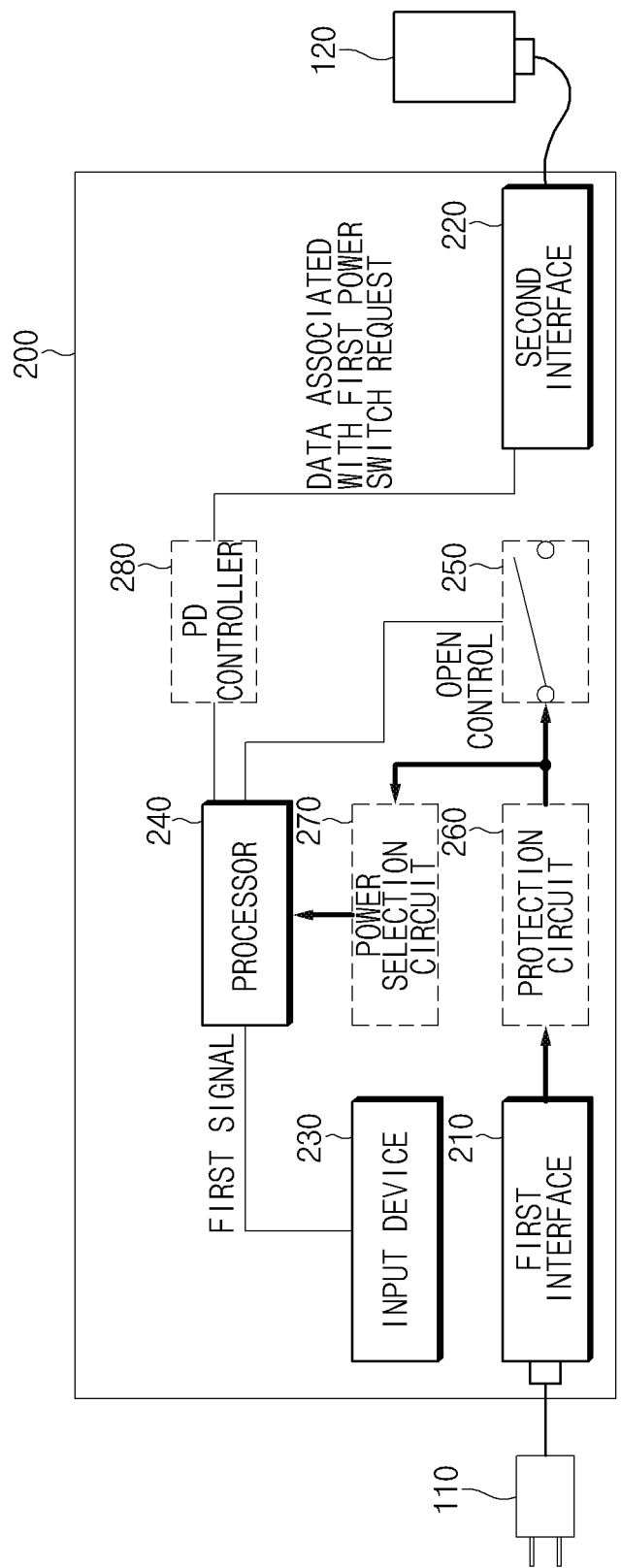

FIG. 3B is a diagram illustrating a power flow in a case where an input device is switched to a first state while a first external electronic device (e.g., 110 of FIG. 1) and a second external electronic device (e.g., 120 of FIG. 1) are connected to an electronic device, according to an embodiment.

Referring to FIG. 3B, in the state where the second external electronic device 120 is connected to the second interface 220 and the first external electronic device 110 is connected to the first interface 210, the processor 240 may receive a first signal associated with the disconnection of the first external electronic device 110 from the input device 230. When receiving the first signal, the processor 240 may transmit data associated with a first power switch request to the second external electronic device 120 through the second interface 220 and may open the switch 250. In this case, because the first external electronic device 110 is not yet detached from the first interface 210, the power selection circuit 270 may output power from the first external electronic device 110 as the driving power of the electronic device 200 including the processor 240.

Figure 3C:
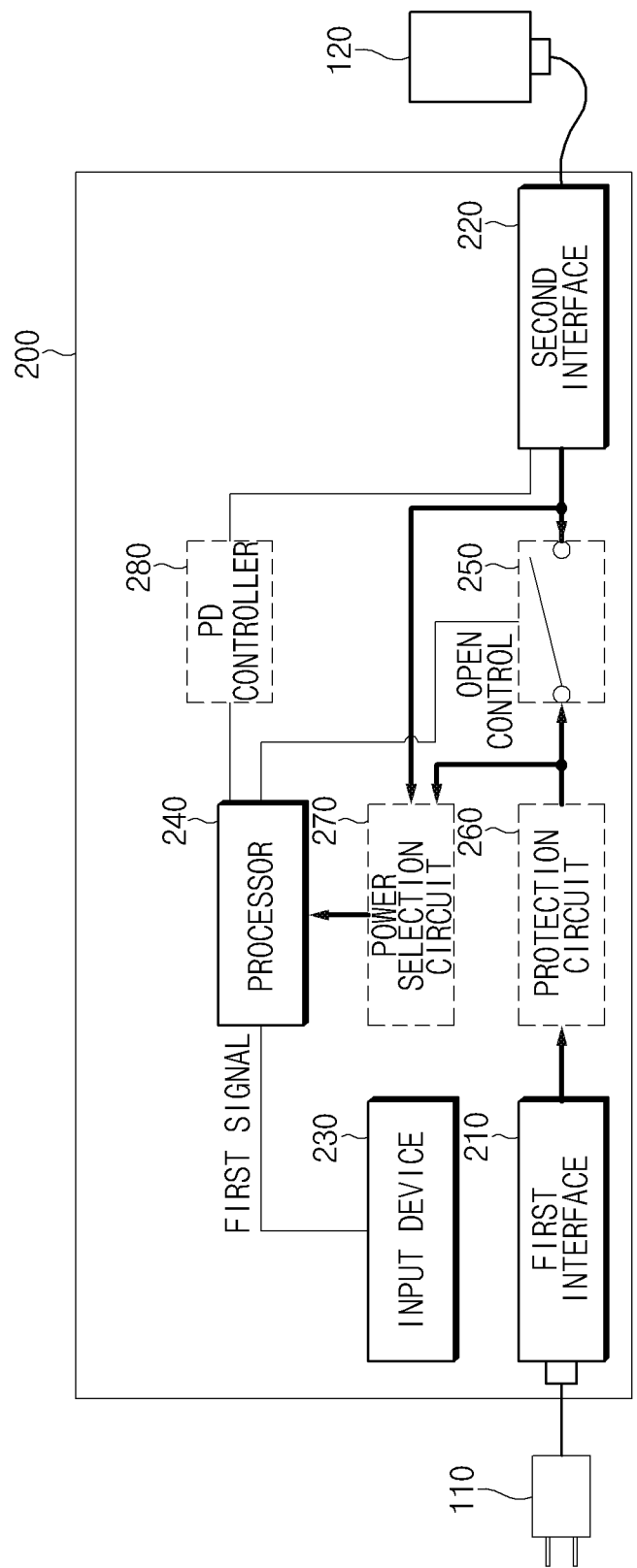

FIG. 3C is a diagram illustrating a power flow in a case where each of the first and second external electronic devices transmits power while a first external electronic device (e.g., 110 of FIG. 1) and a second external electronic device (e.g., 120 of FIG. 1) are connected to an electronic device, according to an embodiment.

Referring to FIG. 3C, when receiving data associated with the first power switch request, the second external electronic device 120 may be converted to a power supply device (source) in response to data associated with the first power switch request and may supply (transmit) power through the second interface 220. Then, the power selection circuit 270 may receive power from both the first external electronic device 110 and the second external electronic device 120; and the power selection circuit 270 may output relatively high power from the first external electronic device 110 among the first external electronic device 110 and the second external electronic device 120 as the driving power of the electronic device 200 including the processor 240.

Figure 3D:
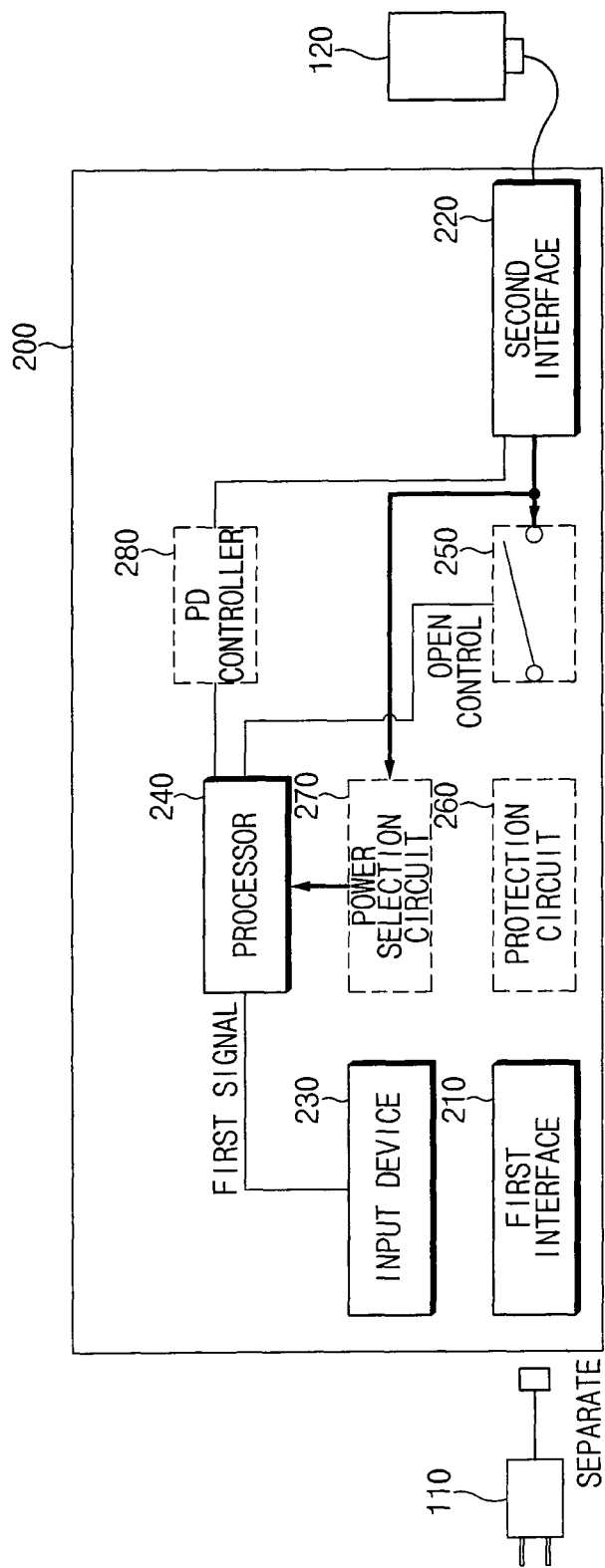

FIG. 3D is a diagram illustrating a power flow in a case where a first external electronic device (e.g., 110 of FIG. 1)

is detached from an electronic device and a second external electronic device (e.g., 120 of FIG. 1) are connected to an electronic device, according to an embodiment.

Referring to FIG. 3D, when the first external electronic device 110 is disconnected from the first interface 210, because the power selection circuit 270 does not receive power from the first external electronic device 110, the power selection circuit 270 may output the power received from the second external electronic device 120 through the second interface 220 as the driving power of the electronic device 200 including the processor 240.

Figure 4A:
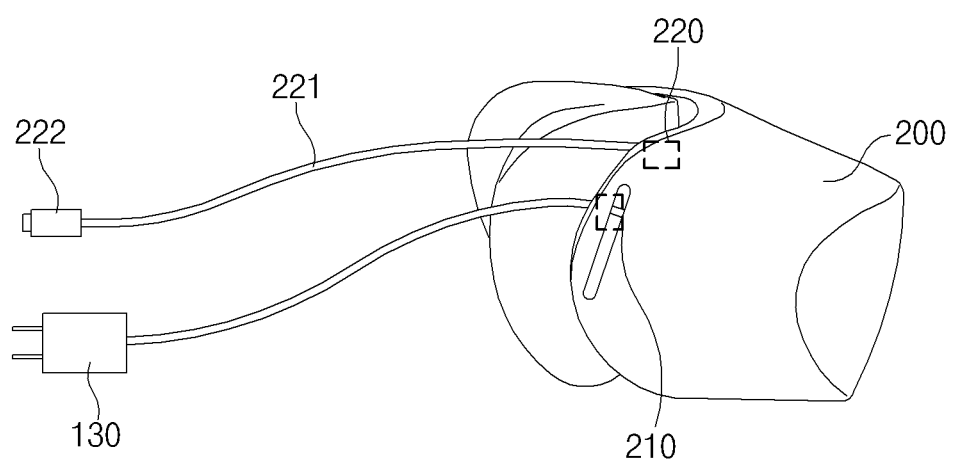
FIGS. 4A, 4B, and 4C are exemplary views of a first interface (e.g., 210 of FIG. 2) and a second interface (e.g., 210 of FIG. 2) according to an embodiment.
Figure 4B:
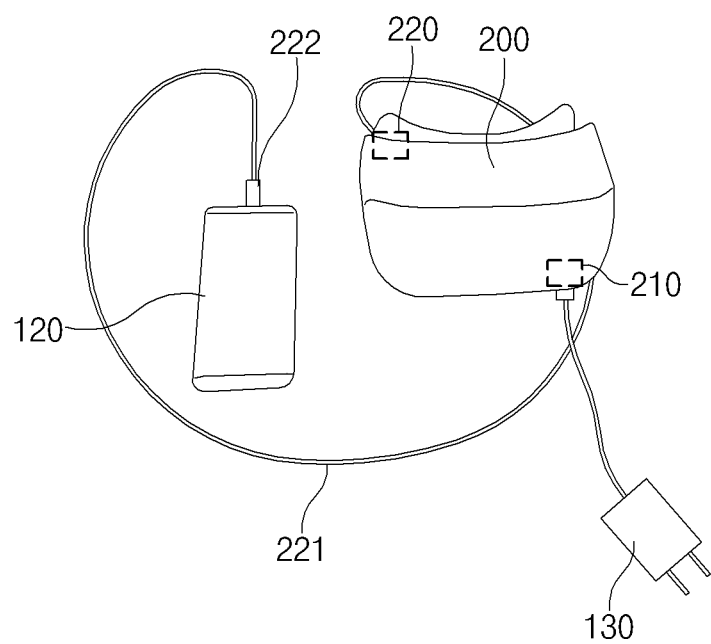
Figure 4C:
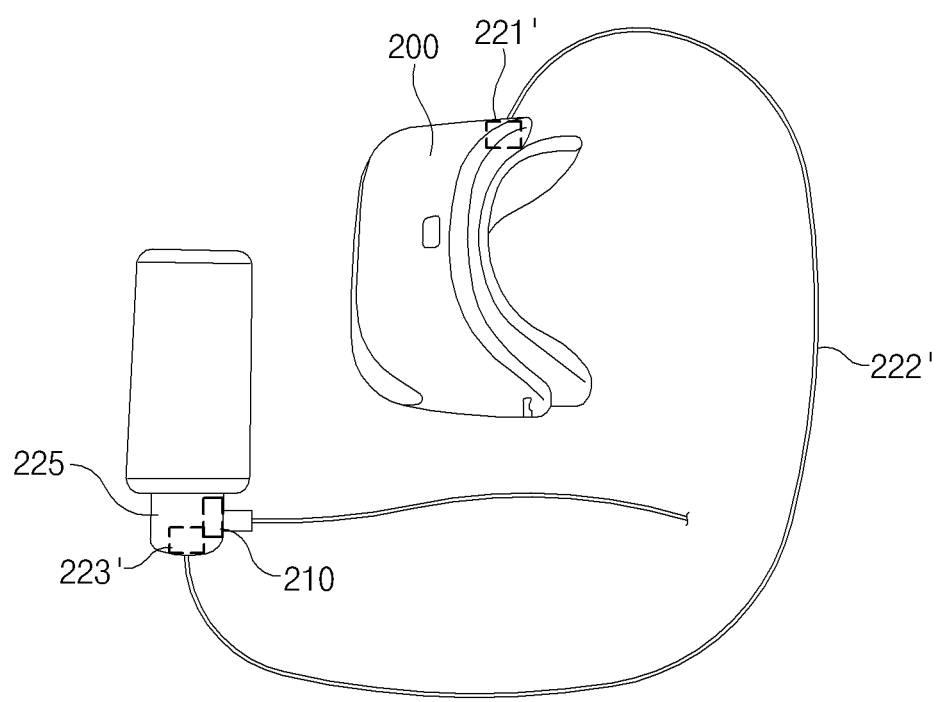

FIGS. 4A, 4B, and 4C are exemplary views of a first interface (e.g., 210 of FIG. 2) and a second interface (e.g., 220 of FIG. 2) according to an embodiment.

Referring to FIG. 4A, according to an embodiment, both the first interface 210 and the second interface 220 may be disposed on one side (e.g., a right side) of the electronic device 200. The first interface 210 may include a socket (or a connector) of a specified standard, and the first external electronic device 110 may be fastened to the socket. The second interface 220 may include a connector 220 mounted on the printed circuit board of the electronic device 200, and the connector 220 may be connected to the first end of a cable 221 extending from one side of the electronic device 200 to the outside. A plug 222 of a specified standard (e.g., USB Type-C) may be electrically connected to the second end of the cable 221. As the plug is inserted into the socket of the second external electronic device 120, the plug may electrically connect the electronic device 200 to the second external electronic device 120.

Referring to FIG. 4B, according to an embodiment, the first interface 210 may include a connector disposed on a bottom surface of the electronic device 200. The first interface 210 may include a socket (or a connector) of a specified standard, and the first external electronic device 110 may be fastened to the socket. The second interface 220 may include the connector 220 mounted on the printed circuit board of the electronic device 200, and the connector 220 may be connected to the first end of the cable 221 extending from one side of the electronic device 200 to the outside. The plug 222 of a specified standard (e.g., USB Type-C) may be electrically connected to the second end of the cable 221. As the plug is inserted into the socket of the second external electronic device 120, the plug may electrically connect the electronic device 200 to the second external electronic device 120.

Referring to FIG. 4C, according to an embodiment, the second interface 220 may include a first connector 221', a cable 222', and a second connector 223'. The first connector 221' may be mounted on the printed circuit board of the electronic device 200 and may be fastened to the first end of the cable 222'; the second end of the cable 222' may be connected to the second connector 223' embedded in an integrated connector device 225. The first interface 210 may include a socket (or a connector) of a specified standard, which is disposed on one side of the integrated connector device 225, and the first external electronic device 110 may be fastened to the socket. According to the above-described embodiment, the first interface 210 and the second interface 220 may be included in the housing of the electronic device 200 and may be included in another device (e.g., 225) electrically connected to the electronic device 200.

Figure 5:
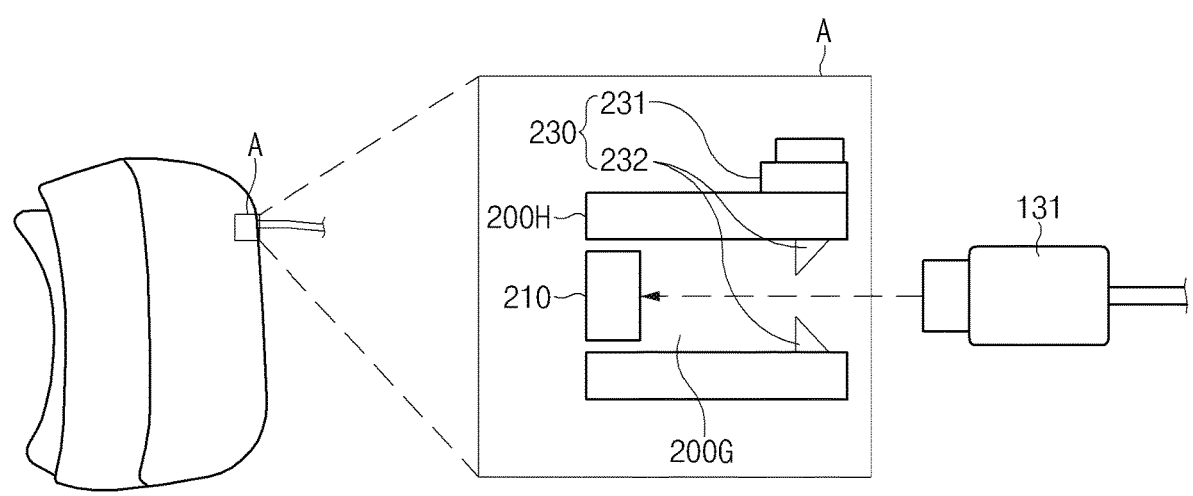
FIG. 5 illustrates a structure of an input device (e.g., 230 of FIG. 2) according to an embodiment.

FIG. 5 illustrates a structure of an input device (e.g., 230 of FIG. 2) according to an embodiment.

Referring to FIG. 5, according to an embodiment, housing 200H of the electronic device 200 may include a coupling hole 200G at a portion where the first interface 210 is formed. The coupling hole 200G may be formed in the size and shape that are capable of mounting a plug 131 of the first external electronic device 110. The coupling hole 200G may be formed to a predetermined depth; the first interface 210 may is disposed in the low portion of the coupling hole 200G; at least part of the input device 230 may be disposed on the upper portion of the coupling hole 200G. When the plug 131 of the first external electronic device 110 is inserted into the first interface 210 (e.g., a socket) inside the coupling hole 200G, as at least part of the input device 230 (e.g., a locking member 232) grasps the rear surface of the plug 131 of the first external electronic device 110, it is possible to prevent the plug 131 from being disconnected from the first interface 210.

According to an embodiment, the input device 230 may include a button 231 and the locking member 232.

For example, the button 231 may be switched to a first state (e.g., a pressed state) or a second state (e.g., a protruding state) depending on the input of the external object; the button 231 may operate in conjunction with a peripheral circuit (e.g., a pull-up or pull down circuit) to output a first signal (e.g., a high signal) in the first state and to output a second signal (e.g., a low signal) in the second state. For example, while the button 231 is pressed by an external object, the button 231 may remain in the first state; when the button 231 is not pressed by an external object, the button 231 may be switched to the second state.

As at least part of the locking member 232 is inserted into the interior of the housing 200H in the first state (e.g., the pressed state) of the button 231, at least part of the locking member 232 may release the plug 131 of the first external electronic device 110 from being mechanically locked to the first interface 210. In this case, the plug 131 of the first external electronic device 110 may be separated from the first interface 210. As the locking member 232 is formed to protrude in the second state of the button 231 and holds the plug 131 of the first external electronic device 110 not to be separated from the coupling hole 200G, the locking member 232 may mechanically lock the plug 131 of the first external electronic device 110 to the first interface 210.

The input device 230 may further include an elastic member (not illustrated) (e.g., a spring) interposed between the button 231 and the locking member 232. The elastic member (not illustrated) may insert at least part of the locking member 232 into the housing 200H by applying a force to pull the locking member 232 toward the interior of the housing 200H in the first state of the button 231. On the other hand, the elastic member (not illustrated) may support at least part of the locking member 232 to protrude outside the housing 200H as the locking member 232 is not pulled in the second state of the button 231. The coupling structure of the button 231, the locking member 232, and the elastic member (not illustrated) may be easily derived by those skilled in the art, and detailed description thereof will be omitted.

Figure 6A:
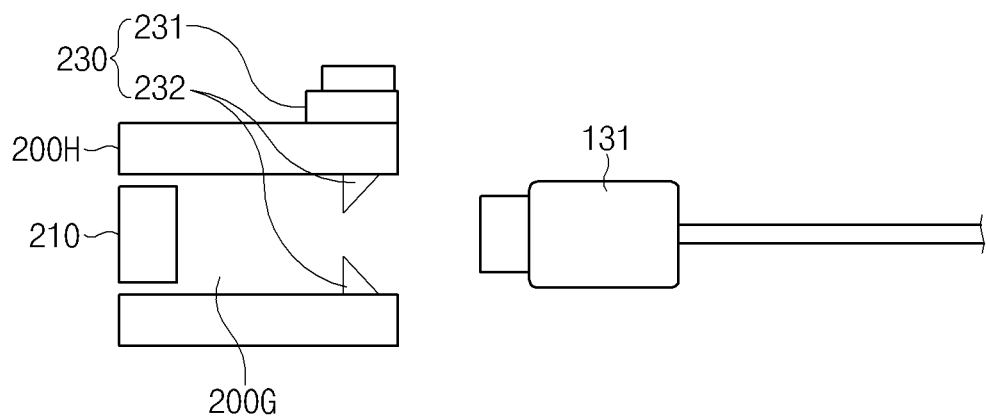
FIGS. 6A, 6B, 6C and 6D are diagrams for describing a lock structure of a first external electronic device (e.g., 110 of FIG. 1) by an input device (e.g., 230 of FIG. 2) according to an embodiment.
Figure 6B:
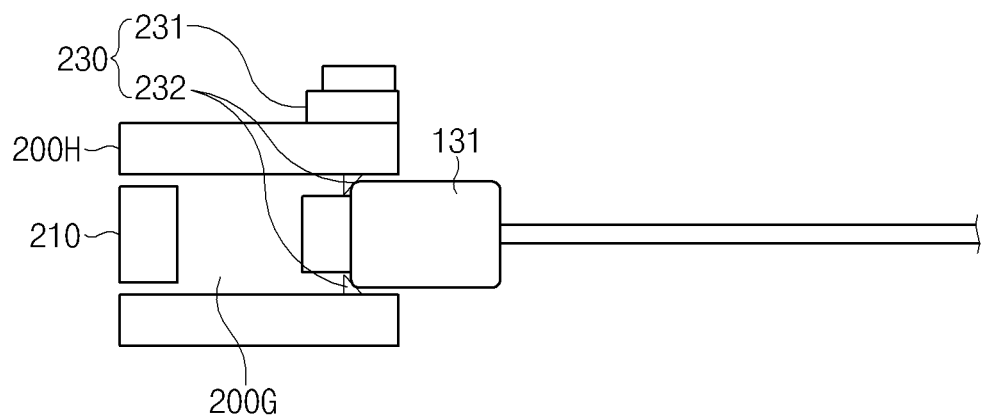
Figure 6C:
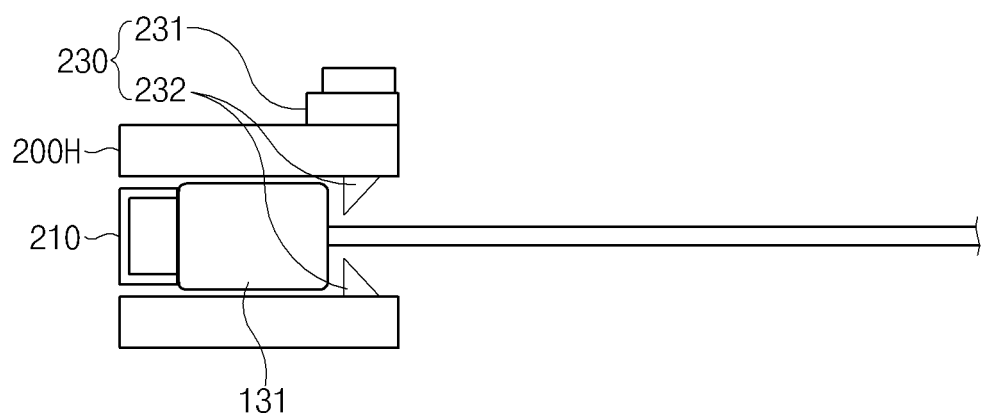

FIGS. 6A, 6B, and 6C are diagrams for describing a lock structure of a first external electronic device (e.g., 110 of FIG. 1) by an input device (e.g., 230 of FIG. 2) according to an embodiment. FIGS. 6A, 6B, and 6C illustrate an enlarged cross-sectional view of region "A" in FIG. 5 and a fastening structure of the plug 131 of the first external electronic device 110.

Referring to FIG. 6A, before the plug 131 of the first external electronic device 110 is inserted into the coupling hole 200G, the locking member 232 may protrude toward the center of the coupling hole 200G.

Referring to FIG. 6B, while the plug 131 of the first external electronic device 110 is inserted into the coupling hole 200G, the plug 131 of the first external electronic device 110 may push the locking member 232 toward the outer side of the coupling hole 200G and the locking member 232 may be inserted into the housing 200H due to the push force of the plug 131.

Referring to FIG. 6C, when the plug 131 of the first external electronic device 110 is inserted into the coupling hole 200G and then coupled to the first interface 210, the locking member 232 may protrude toward the center of the coupling hole 200G by elasticity.

Figure 6D:
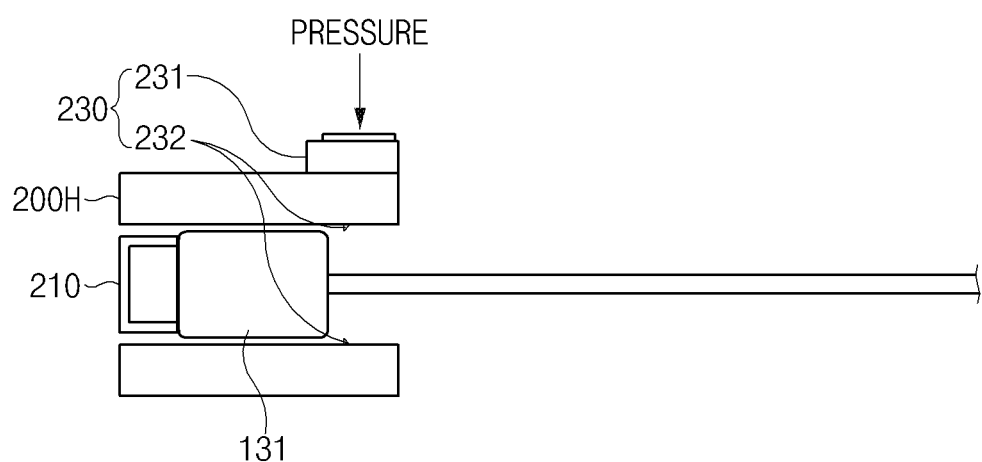

Referring to FIG. 6D, while an external object (a user) presses the button 231, the locking member 232 may be inserted into the housing 200H toward the outside of the coupling hole 200G (the first state of the input device 230). As such, when the plug 131 is moved away from the first interface 210 toward the top from the bottom of the coupling hole 200G because the locking member 232 does not hold the rear surface of the plug 131, the plug 131 may be separated from the first interface 210.

Figure 7:
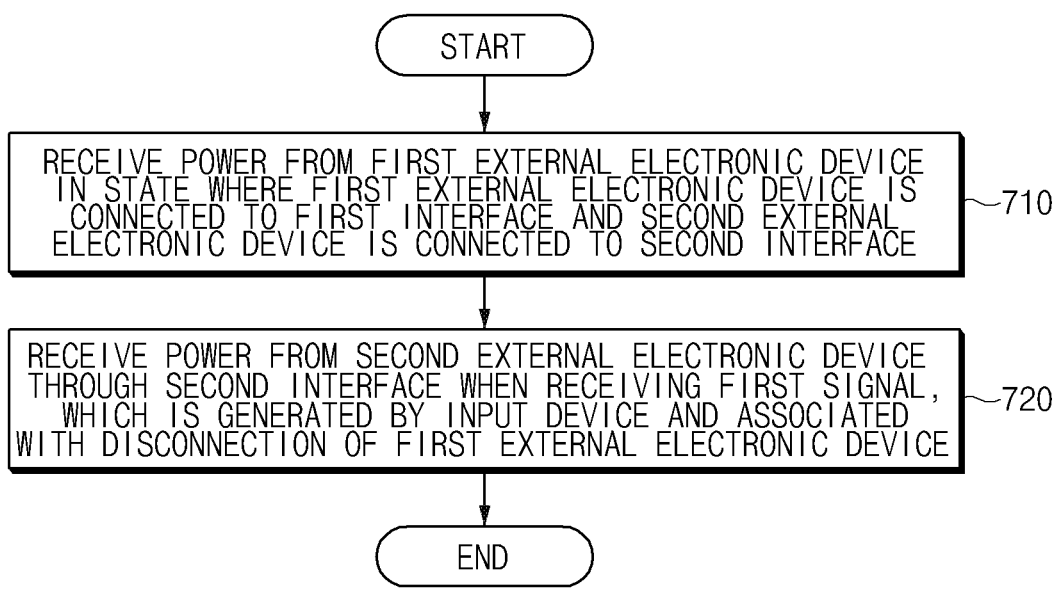
FIG. 7 is a flowchart of a method for receiving power according to an embodiment.

FIG. 7 is a flowchart of a method for receiving power according to an embodiment.

Referring to FIG. 7, in operation 710, in a state where a first external electronic device (e.g., 110 in FIG. 1) is connected to a first interface (e.g., 210 in FIG. 2) and a second external electronic device (e.g., 120 in FIG. 1) is connected to a second interface (e.g., 220 in FIG. 2), the electronic device (e.g., 200 in FIG. 2) may receive power from the first external electronic device 110. The electronic device 200 may operate using the power received from the first external electronic device 110, of which the magnitude (e.g., voltage magnitude) is the greatest, among magnitudes of the power received from the first external electronic device 110 and the second external electronic device 120.

In operation 720, when the electronic device 200 receives a signal (a first signal), which is generated by the input device (e.g., 230 of FIG. 2) and associated with the disconnection of the first external electronic device 110, the electronic device 200 may receive power from the second external electronic device 120 through the second interface 220. For example, when receiving the first signal from the input device 230, the electronic device 200 may transmit data associated with a first power switch request to the second external electronic device 120. The second external electronic device 120 may operate as a power supply device that outputs battery power in response to the first power switch request. Afterward, the electronic device 200 may receive power from the second external electronic device 120 and may use the received power as driving power.

According to an embodiment, an electronic device (e.g., 200 of FIG. 2) may include a first interface (e.g., 210 of FIG. 2), a second interface (e.g., 220 of FIG. 2), an input device (e.g., 230 of FIG. 2) generating a specified signal associated with disconnection of a first external electronic device (e.g., the first external electronic device 110 of FIG. 1), and a processor (e.g., 240 of FIG. 2) operatively connected to the first interface, the second interface, and the input device. The processor may be configured to receive power from the first external electronic device through the first interface in a state where the first external electronic device is connected to the first interface and a second external electronic device (e.g., the second external electronic device 120 of FIG. 1) is connected to the second interface, and to receive power from the second external electronic device through the second interface when receiving the specified signal generated by the input device.

The processor may be configured to transmit data associated with a first power switch request to the second external electronic device through the second interface when receiving the specified signal from the input device, and to receive power from the second external electronic device in response to the first power switch request.

The processor may be configured to transmit data associated with a second power switch request for refraining the second external electronic device from supplying power, to the second external electronic device through the second interface while respectively receiving power from the first external electronic device and the second external electronic device, when receiving a signal associated with the disconnection from the input device.

According to an embodiment, the electronic device may further include a switch (e.g., 250 of FIG. 2) delivering at least part of the power received from the first external electronic device to the second external electronic device through the second interface at a short-circuit time. The processor may be configured to open the shorted switch in a state where the first external electronic device is connected to the first interface, while receiving power from the first external electronic device through the first interface, when receiving the specified signal.

The processor may be configured to receive power from the second external electronic device through the second interface when the first external electronic device is disconnected from the first interface.

The processor may be configured to transmit data associated with a second power switch request for refraining the second external electronic device from supplying power, to the second external electronic device while receiving power from the second external electronic device, when identifying that the first external electronic device is connected to the first interface.

According to an embodiment, the electronic device may further include a power selection circuit (e.g., 270 of FIG. 2) receiving at least one of power delivered from the first external electronic device through the first interface or power delivered from the second external electronic device through the second interface. The power selection circuit may be configured to selectively output higher power among power from the first external electronic device and power from the second external electronic device, as driving power of the processor when receiving power from the first external electronic device through the first interface and when receiving power from the second external electronic device through the second interface.

When the input device is in a first state depending on a first input of an external object, the input device may be configured to release the first external electronic device from being locked to the first interface and to output the specified signal.

When the input device is in a second state depending on a second input of an external object, the input device may be configured to lock the first external electronic device to the first interface, and to output another signal associated with the disconnection.

The input device may include a push button switch or a tap switch that is switched into the first state while being manipulated by an external object.

The input device may include a grip sensor disposed to sense a grip on at least part of the first interface by an external object; and a touch sensor disposed to sense a touch to at least part of the first interface by the external object.

The processor may be configured to receive data from the second external electronic device through the second interface.

According to an embodiment, the electronic device may further include an output device (e.g., 290 of FIG. 2). The processor may be configured to output the received data through the output device.

According to an embodiment, an electronic device (e.g., 200 of FIG. 2) may include a first interface (e.g., 210 of FIG. 2), a second interface (e.g., 220 of FIG. 2), an input device (e.g., 230 of FIG. 2) generating a specified signal associated with disconnection of a first external electronic device, and a processor (e.g., 240 of FIG. 2) operatively connected to the first interface, the second interface, and the input device. The processor may be configured to receive power from the first external electronic device through the first interface in a state where the first external electronic device is connected to the first interface and a second external electronic device is connected to the second interface, to receive power from the second external electronic device through the second interface, and to receive power from the second external electronic device when receiving the specified signal generated by the input device.

The processor may be configured to transmit data associated with a first power switch request to the second external electronic device through the second interface when receiving the specified signal from the input device, and to receive power from the second external electronic device in response to the first power switch request.

The processor may be configured to transmit data associated with a second power switch request for refraining the second external electronic device from supplying power, to the second external electronic device through the second interface while respectively receiving power from the first external electronic device and the second external electronic device, when receiving a signal associated with the disconnection from the input device.

According to an embodiment, the electronic device may further include a switch (e.g., 250 of FIG. 2) delivering at least part of the power received from the first external electronic device to the second external electronic device through the second interface at a short-circuit time. The processor may be configured to open the shorted switch in a state where the first external electronic device is connected to the first interface, while receiving power from the first external electronic device through the first interface, when receiving the specified signal.

Furthermore, according to an embodiment disclosed in this specification, an electronic device (e.g., 200 of FIG. 2) may include a display (e.g., 290 of FIG. 2), a first interface (e.g., 210 of FIG. 2), a second interface (e.g., 220 of FIG. 2), a power supply circuit (e.g., 270 of FIG. 2) electrically connected to a first power supply terminal of the first interface and a second power supply terminal of the second interface, and a switch circuit (e.g., 250 of FIG. 2) electrically connected between the second power supply terminal and the power supply circuit, a detection circuit (e.g., 230 of FIG. 2), and a control circuit (e.g., 240 of FIG. 2). The control circuit may be configured to supply at least part of power supplied through the first power supply terminal from a first power supply of a first external electronic device electrically connected through the first interface, to the display through the power supply circuit, to supply at least another part of power supplied from the first power supply through the second power supply terminal to a second external electronic device electrically connected to the second interface by electrically connecting to the switch circuit, to identify a signal associated with the separation, using the detection circuit in a state where the first external electronic device and the second external electronic device are connected to the electronic device, before the first external electronic device is separated from the first interface, electrically open the switch circuit based at least on a signal associated with the separation and change settings associated with the second interface between the electronic device and the second external electronic device such that the electronic device receives power supplied from a second power supply of the second external electronic device through the second power supply terminal before the first external electronic device is separated, and supply at least part of power supplied from the second power supply of the second external electronic device electrically connected through the second power supply terminal, to the display through the power supply circuit based at least on the changed settings before the first external electronic device is separated.

The processor may be configured to re-change settings associated with the second interface between the electronic device and the second external electronic device in a state where the first external electronic device and the second external electronic device are connected to the electronic device, when receiving another signal associated with the separation through the detection circuit and to supply at least part of power supplied from the first power supply to a second external electronic device through the second power supply terminal by electrically connecting to the switch circuit.

The processor may be configured to receive power from the second external electronic device through the second interface when the first external electronic device is separated from the first interface.

Figure 8:
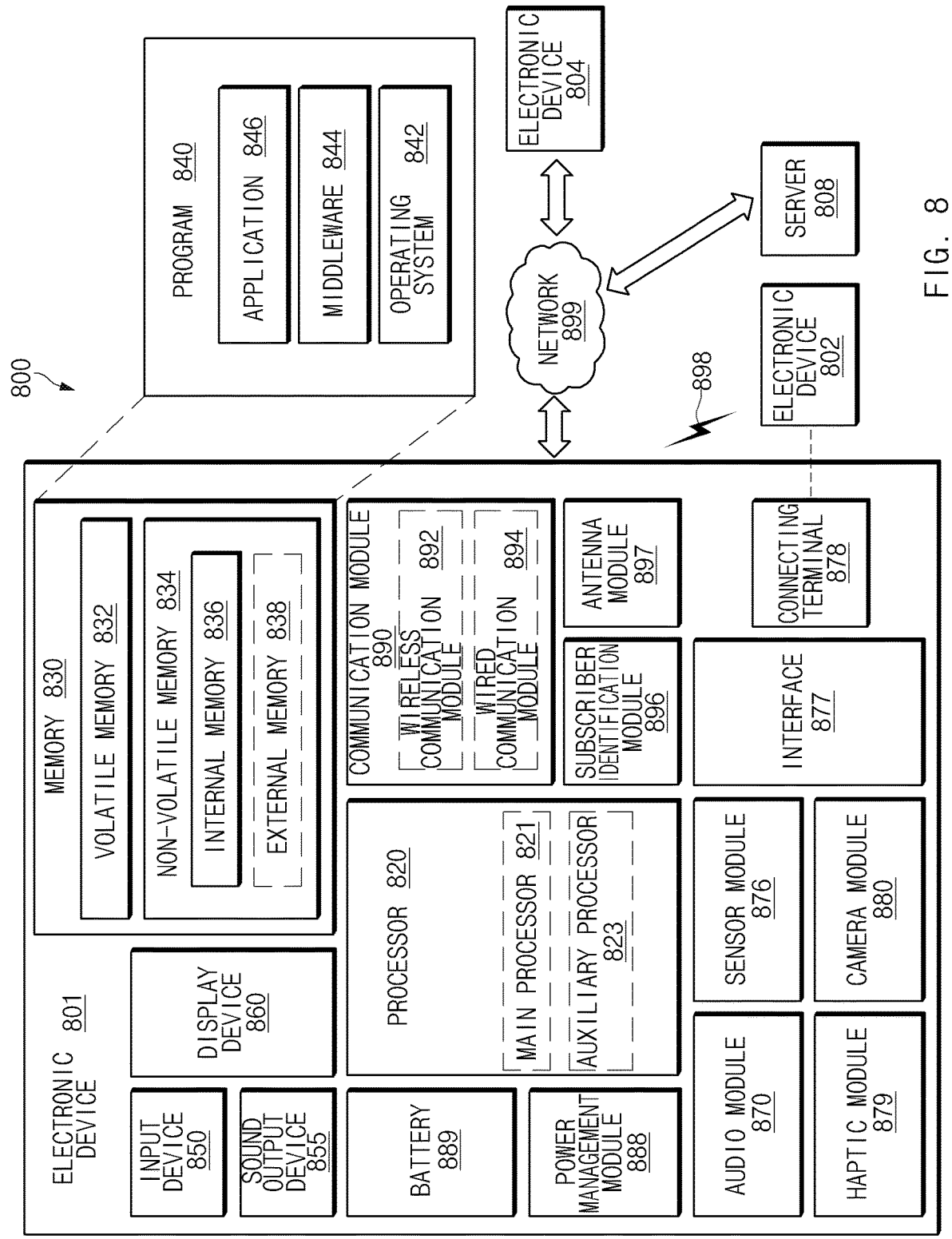
FIG. 8 is a block diagram illustrating an electronic device in a network environment according to various embodiments.

FIG. 8 is a block diagram illustrating an electronic device 801 in a network environment 800 according to various embodiments. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808.

According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thererto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector), The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a first interface connectable to a first external electronic device;
a second interface connectable to a second external electronic device;
an input device configured to generate a specified signal associated with impending disconnection of the first external electronic device from the electronic device; and
a processor operatively connected to the first interface, the second interface, and the input device;
wherein the processor is configured to:
in a state where the first external electronic device is connected to the first interface and the second external electronic device is connected to the second interface, compare a first voltage from the first external electronic device to a second voltage from the second external electronic device;
based on detecting that the first voltage is greater than the second voltage, receive a first power from the first external electronic device through the first interface in absence of receiving a second power from the second external electronic device through the second interface;
when receiving the specified signal generated by the input device, block the first power from the first external electronic device; and
after blocking the first power from the first external electronic device, receive the second power from the second external electronic device through the second interface.

2. The electronic device of claim 1, wherein the processor is configured to:
when receiving the specified signal from the input device, transmit data associated with a first power switch request to the second external electronic device through the second interface; and
receive power from the second external electronic device in response to the first power switch request.

3. The electronic device of claim 1, wherein the processor is configured to:
while respectively receiving power from the first external electronic device and the second external electronic device, when receiving a signal associated with the disconnection from the input device, transmit data associated with a second power switch request for refraining the second external electronic device from supplying power, to the second external electronic device through the second interface.

4. The electronic device of claim 1, further comprising:
a switch configured to supply at least part of the power received from the first external electronic device to the second external electronic device through the second interface,
wherein the processor is configured to:
in response to detecting that the first voltage is greater than the second voltage, close the switch to supply the at least the part of the power to the second external electronic device, and
in response to detecting that the second voltage is greater than the first voltage, open the switch.

5. The electronic device of claim 1, wherein the processor is configured to:
when the first external electronic device is disconnected from the first interface, receive power from the second external electronic device through the second interface.

6. The electronic device of claim 5, wherein the processor is configured to:
while receiving power from the second external electronic device, when identifying that the first external electronic device is connected to the first interface, transmit data associated with a second power switch request for refraining the second external electronic device from supplying power, to the second external electronic device.

7. The electronic device of claim 1, further comprising:
a power selection circuit configured to receive at least one of power delivered from the first external electronic device through the first interface or power delivered from the second external electronic device through the second interface,
wherein the power selection circuit is configured to:
when receiving power from the first external electronic device through the first interface and when receiving power from the second external electronic device through the second interface,
selectively output higher power among power from the first external electronic device and power from the second external electronic device, as driving power of the processor.

8. The electronic device of claim 1, wherein the input device is configured to:
when the input device is in a first state depending on a first input of an external object,
release the first external electronic device from being mechanically locked to the first interface; and
output the specified signal.

9. The electronic device of claim 8, wherein the input device is configured to:
when the input device is in a second state depending on a second input of the external object,
lock the first external electronic device to the first interface mechanically; and
output a signal associated with the disconnection.

10. The electronic device of claim 1, wherein the input device includes a push button switch or a tap switch that is switched into a first state while being manipulated by an external object.

11. The electronic device of claim 1, wherein the input device includes:
a grip sensor disposed to sense a grip on at least part of the first interface by an external object; and
a touch sensor disposed to sense a touch to at least part of the first interface by the external object.

12. The electronic device of claim 1, further comprising:
an output device,
wherein the processor is configured to:
receive data from the second external electronic device through the second interface; and
output the received data through the output device.

13. A wearable head-mounted electronic device, comprising:
a display;
an output device configured to output visual data;
a first interface electrically connected to a first external electronic device;
a second interface electrically connected to a second external electronic device, wherein the first and second external electronic devices are different than the output device;
a power supply circuit;
a switch circuit;
a detection circuit; and
a control circuit, wherein the control circuit is configured to:
receive first power from the first external electronic device through the first interface and second power from the second external electronic device through the second interface,
display image data corresponding to data received from the second external electronic device, and
compare a first voltage of the first power to a second voltage of the second power,
when the first voltage is greater than the second voltage, supply a first part of the first power to the electronic device via the power supply circuit in absence of supplying the second power to the electronic device, and connect the switch circuit to supply a second part of the first power to the second external electronic device through the second interface, and
before detecting disconnection of the first external electronic device, receive a signal associated with impending disconnection of the first external electronic device using the detection circuit, and in response to receiving the signal, opening the switch circuit, and initiating supply of the second power to the electronic device from the second external electronic device,
wherein the first interface is connected to the first external electronic device through a first external cable, and the second interface is connected to the second external electronic device through a second external cable.

14. The wearable head-mounted electronic device of claim 13, wherein the control circuit is configured to:
detecting reconnection of the first external electronic device to the first interface through the detection circuit, and
in response to detecting the connection, closing the switch circuit to reinitiate supply of the second part of the first power to the second external electronic device.

15. The wearable head-mounted electronic device of claim 13, wherein the control circuit is configured to:
when the first external electronic device is disconnected from the first interface, receive power from the second external electronic device through the second interface.

* * * * *